(12) United States Patent
Chen et al.

(10) Patent No.: US 11,004,232 B2
(45) Date of Patent: May 11, 2021

(54) METHOD AND APPARATUS FOR PERFORMING OBJECT DETECTION ACCORDING TO BOUNDING BOX DISTRIBUTION THAT IS DETERMINED BY CONSIDERING LENS CONFIGURATION

(71) Applicant: MEDIATEK INC., Hsin-Chu (TW)

(72) Inventors: Chih-Wei Chen, Hsin-Chu (TW);
Pei-Kuei Tsung, Hsin-Chu (TW);
Shao-Yi Wang, Hsin-Chu (TW);
Hung-Jen Chen, Hsin-Chu (TW);
Kuan-Yu Chen, Hsin-Chu (TW);
Cheng-Lung Jen, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/789,376

(22) Filed: Feb. 12, 2020

(65) Prior Publication Data
US 2021/0012110 A1 Jan. 14, 2021

Related U.S. Application Data

(60) Provisional application No. 62/873,197, filed on Jul. 12, 2019.

(51) Int. Cl.
*G06T 7/70* (2017.01)
*H04N 5/232* (2006.01)
*G06K 9/62* (2006.01)

(52) U.S. Cl.
CPC ............. *G06T 7/70* (2017.01); *G06K 9/6217* (2013.01); *H04N 5/23229* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 8,711,248 B2 | 4/2014 | Jandhyala | |
| 8,971,666 B2 | 3/2015 | Yu | |
| 9,007,432 B2 | 4/2015 | Chuang | |
| 2010/0111440 A1 | 5/2010 | Chai | |
| 2013/0258047 A1 | 10/2013 | Morimoto | |
| 2019/0102868 A1 | 4/2019 | Beric | |
| 2020/0117918 A1* | 4/2020 | Wallin | G06T 3/4038 |
| 2020/0134331 A1* | 4/2020 | Poddar | G06T 5/006 |
| 2020/0410252 A1* | 12/2020 | Tsoi | G06K 9/6202 |

FOREIGN PATENT DOCUMENTS

| | | |
|---|---|---|
| CN | 106162144 A | 11/2016 |
| CN | 108256547 A | 7/2018 |
| TW | 201516378 A | 5/2015 |
| TW | 201917697 A | 5/2019 |

\* cited by examiner

*Primary Examiner* — Justin P. Misleh
(74) *Attorney, Agent, or Firm* — Winston Hsu

(57) ABSTRACT

An object detection apparatus includes a boundary box decision circuit and a processing circuit. The boundary box decision circuit receives lens configuration information of a lens, and refers to the lens configuration information to determine a bounding box distribution of bounding boxes that are assigned to different detection distances with respect to the lens for detection of a target object. The processing circuit receives a captured image that is derived from an output of an image capture device using the lens, and performs object detection upon the captured image according to the bounding box distribution of the bounding boxes.

20 Claims, 9 Drawing Sheets

METHOD AND APPARATUS FOR PERFORMING OBJECT DETECTION ACCORDING TO BOUNDING BOX DISTRIBUTION THAT IS DETERMINED BY CONSIDERING LENS CONFIGURATION

CROSS REFERENCE TO RELATED APPLICATIONS

This application claims the benefit of U.S. provisional application No. 62/873,197, filed on Jul. 12, 2019 and incorporated herein by reference.

BACKGROUND

The present invention relates to object detection, and more particularly, to a method and apparatus for performing object detection according to bounding box distribution that is determined by considering lens configuration.

There is a growing trend on fisheye-camera-based applications, including surveillance applications, augmented reality (AR) applications, virtual reality (VR) applications, automotive applications, etc. In general, an image content that is captured by passing incident light onto an image sensor through a fisheye lens is severely distorted, and may be converted into an equi-rectangular projection (ERP) image with un-distorted longitude for further image processing such as objection detection. Object detection is widely used in many fields. For example, in self-driving technology, we need to plan routes by identifying the locations of vehicles, pedestrians, roads, and obstacles in the captured image. For another example, systems in the security field need to detect abnormal targets such as intruders.

In general, objection detection requires more than one million training images. If an objection detection apparatus trained by using normal images generated from a camera with a normal lens is used to perform object detection upon fisheye images generated from a camera with a fisheye lens, the object detection accuracy will drop significantly. One conventional solution is to collect and label one million images for fisheye images and then retrain the object detection apparatus. However, it is unrealistic to collect and label one million images for fisheye images and then retrain the object detection apparatus if the user changes the lens.

SUMMARY

One of the objectives of the claimed invention is to provide a method and apparatus for performing object detection according to bounding box distribution that is determined by considering lens configuration.

According to a first aspect of the present invention, an exemplary object detection apparatus is disclosed. The exemplary object detection apparatus includes a boundary box decision circuit and a processing circuit. The boundary box decision circuit is arranged to receive lens configuration information of a lens, and refer to the lens configuration information to determine a bounding box distribution of bounding boxes that are assigned to different detection distances with respect to the lens for detection of a target object. The processing circuit is arranged to receive a captured image that is derived from an output of an image capture device using the lens, and perform object detection upon the captured image according to the bounding box distribution of the bounding boxes.

According to a second aspect of the present invention, an exemplary object detection method is disclosed. The exemplary object detection method includes: receiving lens configuration information of a lens; determining, by a boundary box decision circuit, a bounding box distribution of bounding boxes according to the lens configuration information, wherein the bounding boxes are assigned to different detection distances with respect to the lens for detection of a target object; receiving a captured image that is derived from an output of an image capture device using the lens; and performing object detection upon the captured image according to the bounding box distribution of the bounding boxes.

According to a third aspect of the present invention, an exemplary object detection method is disclosed. The exemplary object detection method includes: receiving captured images that are successively generated while a target object moves from a first end of a target detection distance range to a second end of the target detection distance range; and performing, by a processing circuit, object detection upon the captured images according to a plurality of bounding boxes with different detection ranges, wherein said object detection detects the target object in each of the captured images by using at least one of the bounding boxes.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
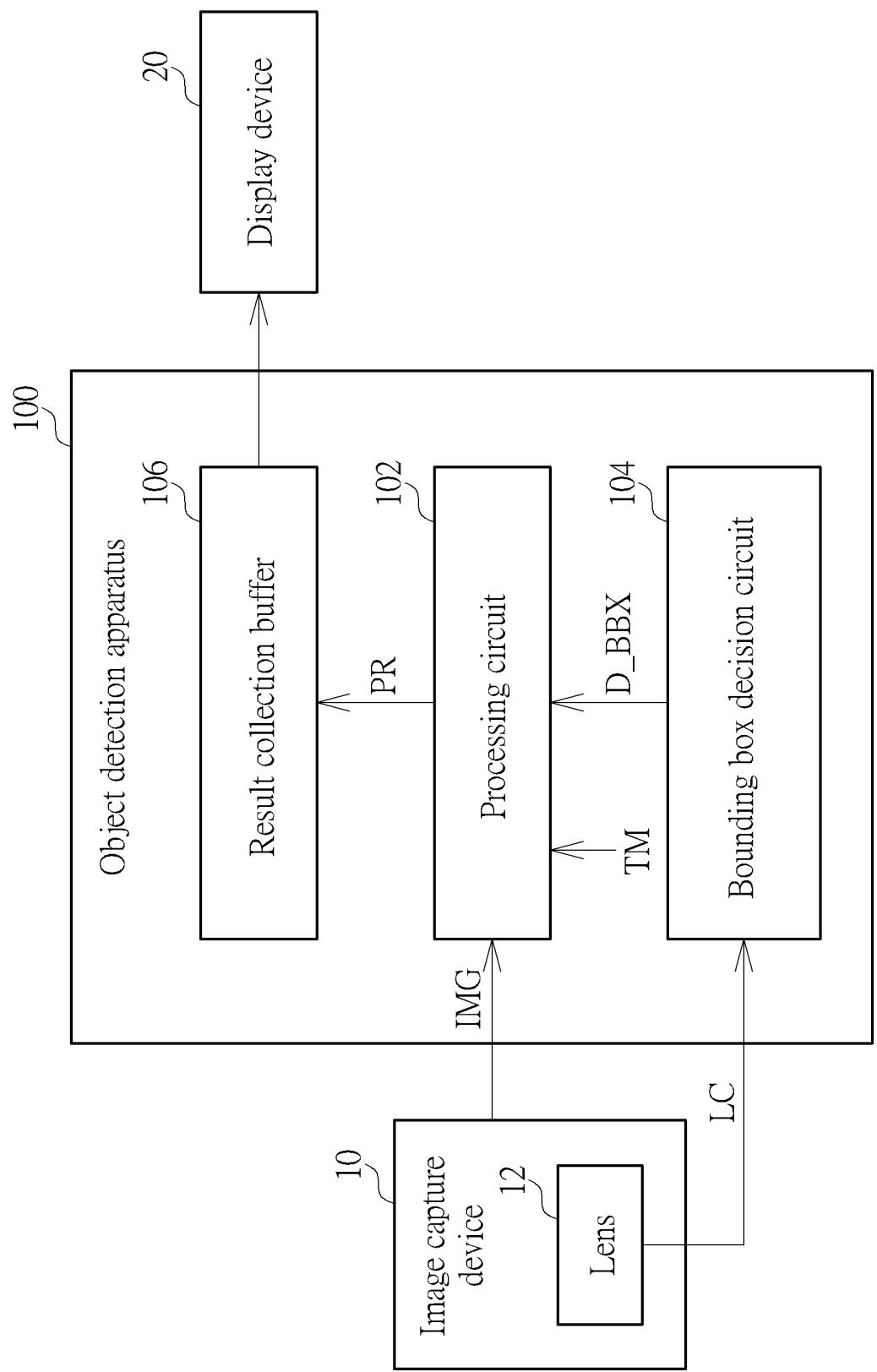
FIG. 1 is a diagram illustrating a first object detection arrangement according to an embodiment of the present invention.

FIG. 1 is a diagram illustrating a first object detection arrangement according to an embodiment of the present invention. The object detection apparatus 100 includes a processing circuit 102, a bounding box decision circuit 104, and a result collection buffer 106. The boundary box decision circuit 104 is arranged to receive lens configuration information LC of a lens 12, and refer to the lens configuration information LC to determine a bounding box distribution D_BBX of bounding boxes that are assigned to different detection distances with respect to the lens 12 for detection of a target object. The processing circuit 102 is arranged to receive a captured image IMG that is derived from an output of an image capture device 10 using the lens 12, and perform object detection upon the captured image IMG according to the bounding box distribution D_BBX of the bounding boxes. The result collection buffer 106 is arranged to store a processing result PR of object detection performed upon the captured image IMG. The result collection buffer 106 is coupled to a display device 20, such that the processing result PR is displayed on the display device 20. For example, when the target object is well detected within a detection range of a bounding box, the bounding box may be displayed on a screen of the display device 20 to indicate the location of the target object.

In this embodiment, the object detection performed by the processing circuit 102 may be deep-learning based object detection. Hence, the processing circuit 102 may be implemented using an artificial intelligence (AI) processor. For example, the processing circuit 102 may be a convolution accelerator, a graphics processing unit (GPU), or an application-specific integrated circuit (ASIC). For certain applications, the image capture device 10 may be a camera module, and the lens 12 used by the image capture device 10 may be a wide-range lens such as a fisheye lens.

In the embodiment shown in FIG. 1, the object detection apparatus 100 (particularly, processing circuit 102) is coupled to the image capture device 10, and receives the captured image IMG from the image capture device 10. In addition, the object detection apparatus 100 (particularly, bounding box decision circuit 104) is coupled to the image capture device 10, and receives the lens configuration information LC of the lens 12 from the image capture device 10. For example, the object detection apparatus 100 and the image capture device 10 may be installed on the same electronic device. Hence, both of the processing circuit 102 and the bounding box decision circuit 104 may obtain data from the image capture device 10 directly. However, this is for illustrative purposes only, and is not meant to be a limitation of the present invention.

Figure 2:
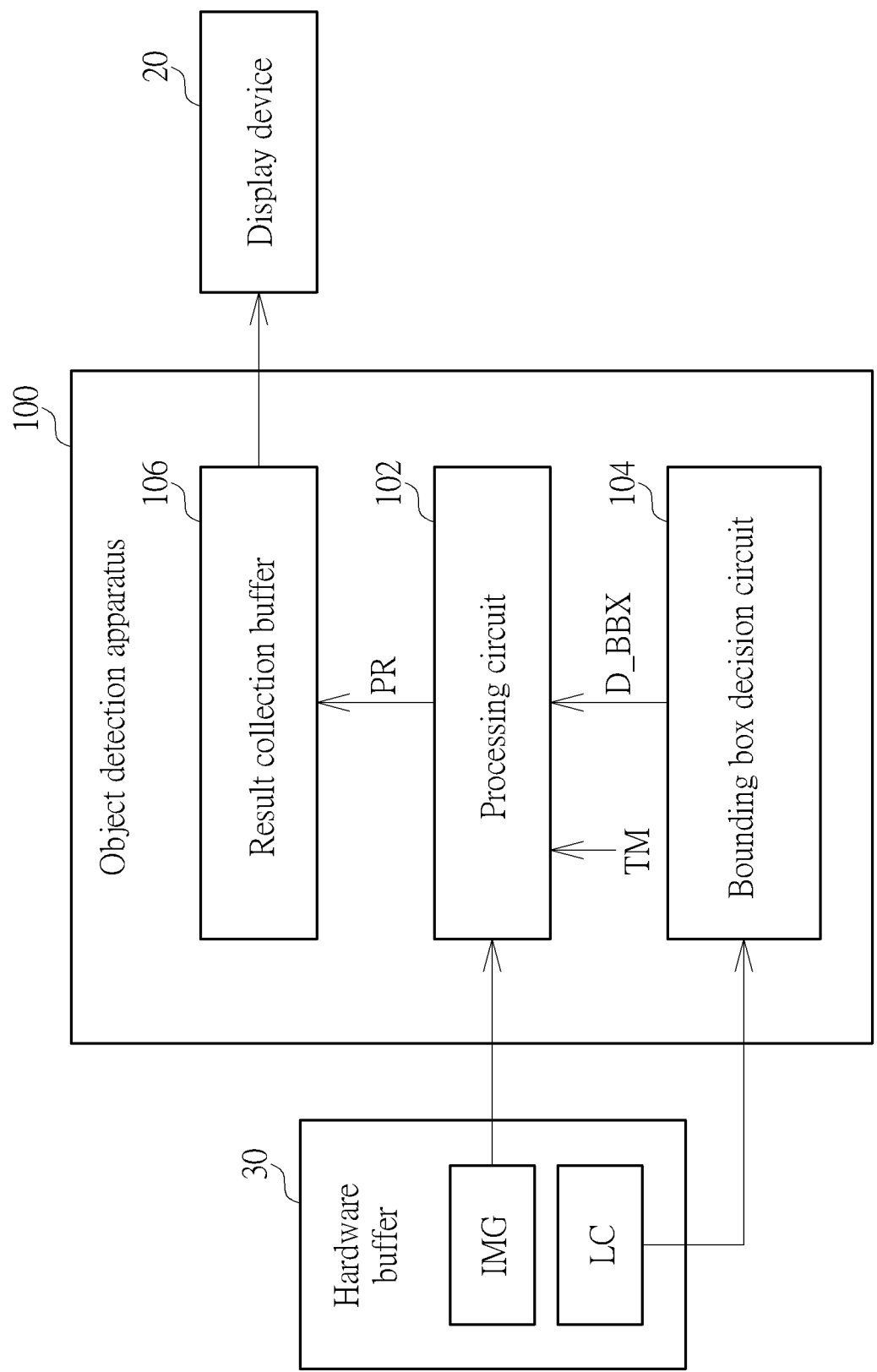
FIG. 2 is a diagram illustrating a second object detection arrangement according to an embodiment of the present invention.

FIG. 2 is a diagram illustrating a second object detection arrangement according to an embodiment of the present invention. In this embodiment, the object detection apparatus 100 is coupled to a hardware buffer 30. The hardware buffer 30 is arranged to store the lens configuration information LC of the lens 12 and the captured image IMG generated from the image capture device 10 using the lens 12. The hardware buffer 30 is not a part of the image capture device 10. Hence, none of the processing circuit 102 and the bounding box decision circuit 104 may obtain data from the image capture device 10 directly. For example, the object detection apparatus 100 and the image capture device 10 may not be installed on the same electronic device. Hence, the processing circuit 102 retrieves the captured image IMG from the hardware buffer 30, and the bounding box decision circuit 104 retrieves the lens configuration information LC of the lens 12 from the hardware buffer 30.

In this embodiment, the object detection apparatus 100 adapts an object detection process running on the processing circuit 102 to the lens configuration information LC of the lens 12. In other words, the object detection process is adaptively adjusted in response to the lens configuration information LC of the lens 12. For example, the processing circuit (e.g., AI processor) 102 employs different bounding box distributions when performing objection detection upon captured images generated from different lens.

Regarding a fisheye lens, a training model TM with a large number of anchor boxes is obtained from a lot of training images. The anchor boxes are rectangles with different shapes for detection of objects with related sizes in captured frames. The processing circuit 102 is provided with the training model TM with anchor boxes, and the boundary box decision circuit 104 refers to the lens configuration information LC of the lens 12 to select only a portion of the anchor boxes as bounding boxes used by an object detection process running on the processing circuit 102. Specifically, the bounding box distribution D_BBX is properly set to ensure that a detection bounding box range required by a target detection distance range is fully covered by detection ranges of bounding boxes that are determined on the basis of the lens configuration information LC. Hence, the processing circuit 102 may perform deep-learning based object detection upon the captured image IMG by using the training model TM that is modified to use some of the anchor boxes as selected by the bounding box decision circuit 104. Further details of the boundary box decision circuit 104 are described as below.

Figure 3:
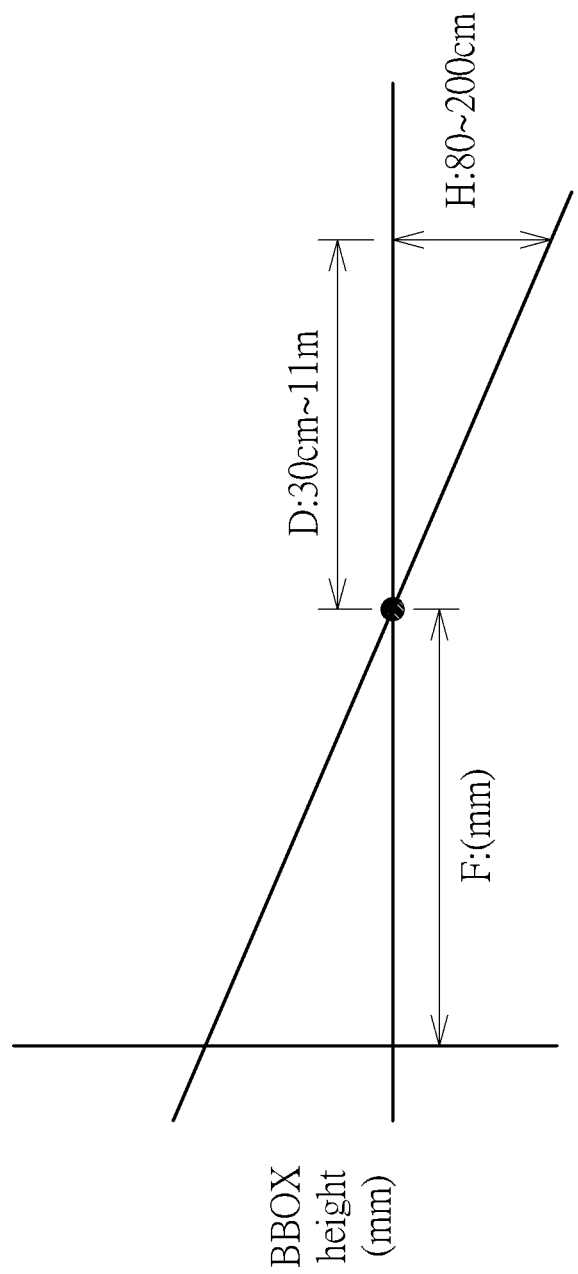
FIG. 3 is a diagram illustrating a pin hole model used by a boundary box decision circuit shown in FIG. 1 to determine a bounding box height (image height) on an image plane.

FIG. 3 is a diagram illustrating a pin hole model used by the boundary box decision circuit 104 to determine a bounding box (BBOX) height (image height) on an image plane. Suppose that object detection is required to detect a target object that has an object height H within a range from 80 cm to 200 cm and is located at a detection distance D within a target detection distance range from 30 cm to 11 m. The image height of the target object on the image plane is determined by (F*H)/D, where F represents a focal length of the lens 12 used by the image capture device 10, D represents a particular detection distance with respect to the lens 12, and H represents a particular object height of the target object located at the particular detection distance. The image height of the target object on the image plane can be used to determine a bounding box height of a bounding box used for detection of the target object that has the particular object height and is at the particular detection distance with respect to the lens 12. Since the lens 12 used by the image capture device 10 may introduce distortions, the lens configuration information LC of the lens 12 is referenced by the boundary box decision circuit 104 to find a real image height of the target object on the image plane for each detection distance with respect to the lens 12 (i.e., D: 30 cm~11 m).

Figure 4:
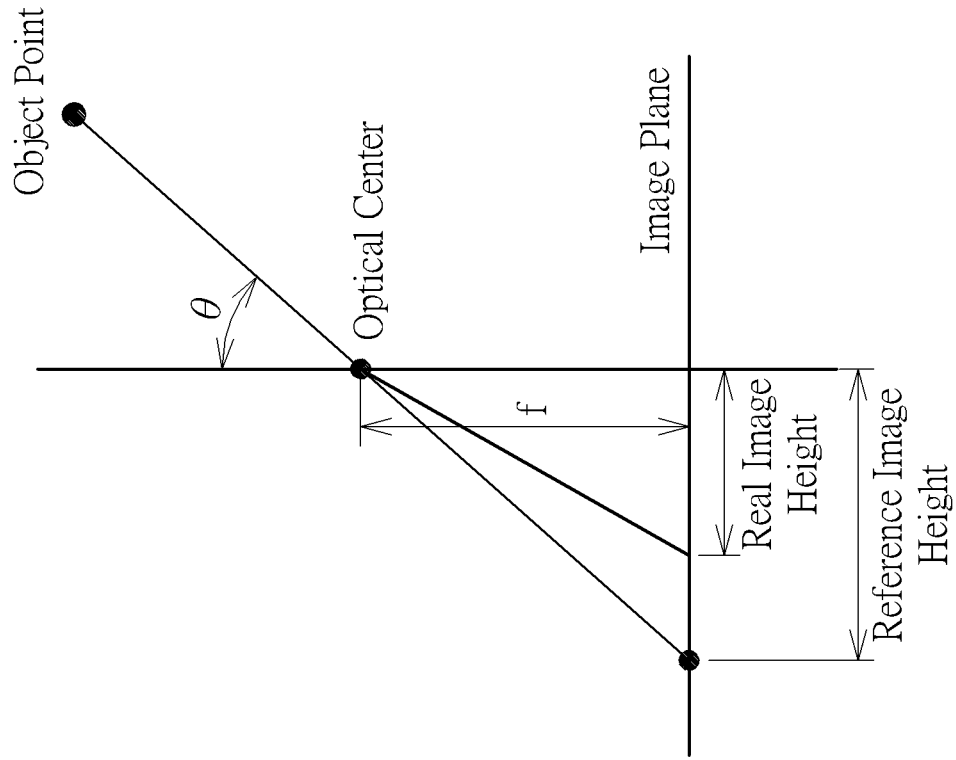
FIG. 4 is a diagram illustrating the principle of mapping a reference image height on an image plane to a real image height on the image plane.

FIG. 4 is a diagram illustrating the principle of mapping a reference image height on an image plane to a real image height on the image plane. The lens configuration information LC of the lens 12 may be set and provided by a manufacturer of the lens 12, and may include mapping information associated with the real image height. For example, the following mapping table is a part of the lens configuration information LC.

TABLE 1

| θ [°] | Real Image Height Y[mm] | Reference Image Height Y0 = f*tan θ Y0[mm] |
|---|---|---|
| 59.8 | 1.138 | 1.813 |
| 59.9 | 1.140 | 1.820 |
| 60.0 | 1.142 | 1.828 |
| 60.1 | 1.144 | 1.835 |
| 69.8 | 1.327 | 2.868 |
| 69.9 | 1.329 | 2.884 |
| 70.0 | 1.331 | 2.899 |

After the real image heights for the target object at different detection distances within the target detection distance range are obtained through using mapping information included in the lens configuration information LC of the lens 12, the bounding box decision circuit 104 maps each real image height of the target object at a particular detection distance to a pixel number according to a pixel density of an image sensor (not shown) used by the image capture device 10. The pixel density of the image sensor depends on the number of pixels included in the image sensor and the size of the image sensor. Hence, a pixel number of a real image height can be obtained by multiplying the real image height (mm) and a parameter that specifies the number of pixels per cell size (pixels/mm).

Figure 5:
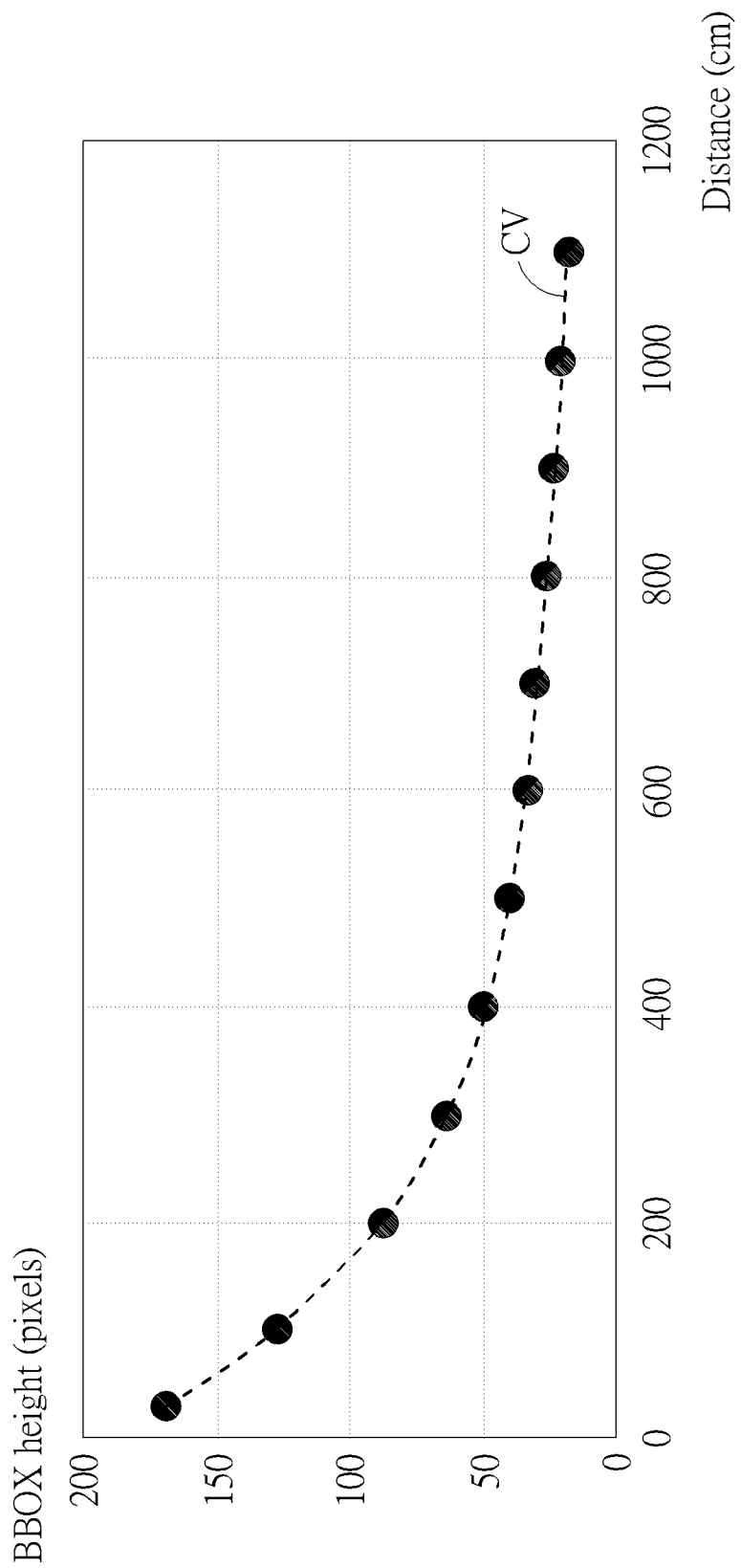
FIG. 5 is a diagram illustrating a lens distribution curve calculated by the boundary box decision circuit shown in FIG. 1 according to an embodiment of the present invention.

Next, the bounding box decision circuit 104 calculates a lens distribution curve according to pixel numbers determined for real image heights of the target object at different detection distances within the target detection distance range. FIG. 5 is a diagram illustrating a lens distribution curve according to an embodiment of the present invention. Suppose that a target object to be captured has an object height being 180 cm, and the target detection distance range is from 30 cm to 11 m. The lens distribution curve CV may be represented using a polynomial function. For example, a curve fitting method may be employed by the bounding box decision circuit 104 to find the lens distribution curve CV, such that the pixel numbers determined for real image heights of the target object at different detection distances within the target detection distance range fit the lens distribution curve CV. In accordance with the lens distribution curve CV, the image height in pixels can be referenced to determine a bounding box (BBOX) height in pixels.

In this embodiment, the target detection distance range (e.g., 30 cm~11 m) may be evenly divided into a plurality of detection segments, and one bounding box is selected from anchor boxes of the training model TM and assigned to one branch point of the target detection distance range (e.g., 30 cm~11 m). In a case where the captured image IMG to be processed by the processing circuit 102 is derived from converting a fisheye image into an equi-rectangular projection (ERP) image, the image height in pixels is further mapped to an ERP domain, and one bounding box is selected for the image height in the ERP domain. The following table shows an example of mapping image heights to the ERP domain and partitioning the target detection distance range (e.g., 30 cm~11 m) into six detection segments.

TABLE 2

| Segments (cm) | Image height (fisheye image) | Image height (ERP image) |
|---|---|---|
| 30 | 168.495324 | 222.968699 |
| 208.3333333 | 86.62321952 | 114.6279084 |
| 386.6666667 | 51.2 | 67.75260652 |
| 565 | 36.5 | 48.30019801 |
| 743.3333333 | 27.5 | 36.39056014 |
| 921.6666667 | 22.5 | 29.77409466 |
| 1100 | 18.8888 | 22.05 |

Hence, regarding the image heights in the ERP domain {222.968699, 114.6279084, 67.75260652, 48.30019801, 36.39056014, 29.77409466, 22.05}, the bounding box decision circuit 104 determines the bounding box distribution D_BBX of seven bounding boxes that are assigned to branch points at different detection distances {30, 208.3333333, 386.6666667, 565, 743.3333333, 921.6666667, 1100}.

Figure 6:
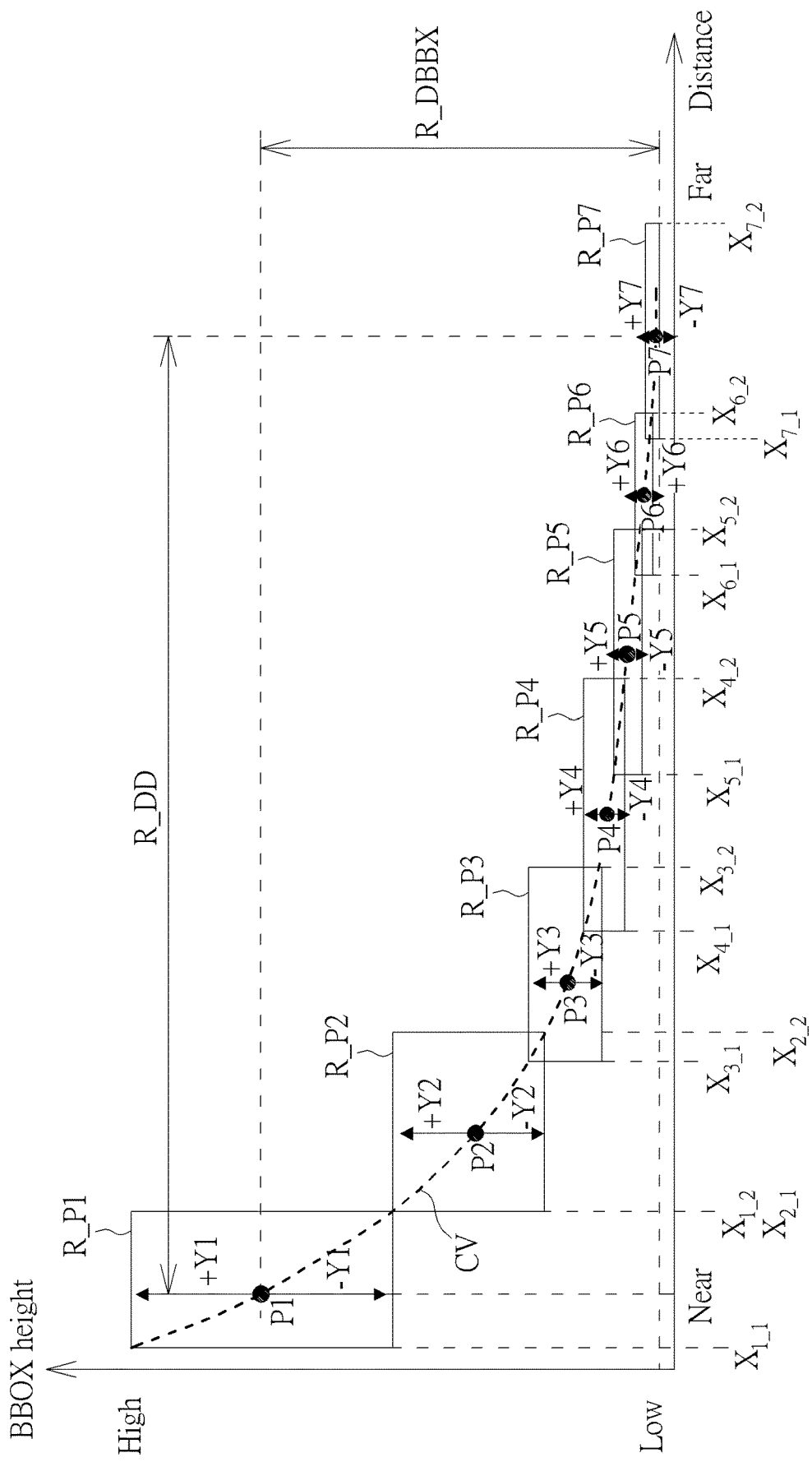
FIG. 6 is a diagram illustrating an example of a bounding box distribution that is determined on the basis of lens configuration information according to an embodiment of the present invention.

It should be noted that, in accordance with information given from the lens distortion curve CV, the bounding box distribution D_BBX is properly set to ensure that a detection bounding box range required by a target detection distance range is fully covered by detection ranges of the bounding boxes. FIG. 6 is a diagram illustrating an example of the bounding box distribution D_BBX that is determined on the basis of the lens configuration information LC according to an embodiment of the present invention. For simplicity and clarity, it is assumed that the captured image IMG to be processed by the processing circuit 102 is a fisheye image, and a target detection distance range R_DD is evenly divided into six segments delimited by seven branch points that are mapped to points {P1, P2, P3, P4, P5, P6, P7} on the lens distortion curve CV. In this embodiment, the X-axis represents the detection distance with respect to the lens 12, and the Y-axis represents the bounding box (BBOX) height.

The point P1 has an X-axis coordinate value X_P1 and a Y-axis coordinate value Y_P1. The point P2 has an X-axis coordinate value X_P2 and a Y-axis coordinate value Y_P2. The point P3 has an X-axis coordinate value X_P3 and a Y-axis coordinate value Y_P3. The point P4 has an X-axis coordinate value X_P4 and a Y-axis coordinate value Y_P4. The point P5 has an X-axis coordinate value X_P5 and a Y-axis coordinate value Y_P5. The point P6 has an X-axis coordinate value X_P6 and a Y-axis coordinate value Y_P6. The point P7 has an X-axis coordinate value X_P7 and a Y-axis coordinate value Y_P7. For example, the X-axis coordinate values {X_P1, X_P2, X_P3, X_P4, X_P5, X_P6, X_P7} may be the aforementioned detection distance values {30, 208.3333333, 386.6666667, 565, 743.3333333, 921.6666667, 1100}. The bounding boxes assigned to the X-axis coordinate values {X_P1, X_P2, X_P3, X_P4, X_P5, X_P6, X_P7} have bounding box heights equal to the Y-axis coordinate values {Y_P1, Y_P2, Y_P3, Y_P4, Y_P5, Y_P6, Y_P7}, respectively.

Regarding a bounding box that is assigned to the X-axis coordinate value X_P1 and has a bounding box height equal to the Y-axis coordinate value Y_P1, it offers a detection range R_P1 defined by {Y_P1+Y1, Y_P1-Y1} in Y-axis direction and $\{X_{1\_1}, X_{1\_2}\}$ in X-axis direction, where Y1 is determined by Y_P1. For example, Y1=0.25*Y_P1. In accordance with the lens distribution curve CV, an image height of the target object is equal to Y_P1+Y1 when the target object is located at $X_{1\_1}$, and an image height of the target object is equal to Y_P1-Y1 when the target object is located at $X_{1\_2}$. In other words, when the target object moves within a distance range $\{X_{1\_1}, X_{1\_2}\}$, the target object can be detected from the captured image IMG by using the bounding box that is assigned to the X-axis coordinate value X_P1 and has a bounding box height equal to the Y-axis coordinate value Y_P1.

Regarding a bounding box that is assigned to the X-axis coordinate value X_P2 and has a bounding box height equal to the Y-axis coordinate value Y_P2, it offers a detection range R_P2 defined by {Y_P2+Y2, Y_P2-Y2} in Y-axis direction and {$X_{2\_1}$, $X_{2\_2}$} in X-axis direction, where Y2 is determined by Y_P2. For example, Y2=0.25*Y_P2. In accordance with the lens distribution curve CV, an image height of the target object is equal to Y_P2+Y2 when the target object is located at $X_{2\_1}$, and an image height of the target object is equal to Y_P2-Y2 when the target object is located at $X_{2\_2}$. In other words, when the target object moves within a distance range {$X_{2\_1}$, $X_{2\_2}$}, the target object can be detected from the captured image IMG by using the bounding box that is assigned to the X-axis coordinate value X_P2 and has a bounding box height equal to the Y-axis coordinate value Y_P2.

Regarding a bounding box that is assigned to the X-axis coordinate value X_P3 and has a bounding box height equal to the Y-axis coordinate value Y_P3, it offers a detection range R_P3 defined by {Y_P3+Y3, Y_P3-Y3} in Y-axis direction and {$X_{3\_1}$, $X_{3\_2}$} in X-axis direction, where Y3 is determined by Y_P3. For example, Y3=0.25*Y_P3. In accordance with the lens distribution curve CV, an image height of the target object is equal to Y_P3+Y3 when the target object is located at $X_{3\_1}$, and an image height of the target object is equal to Y_P3-Y3 when the target object is located at $X_{3\_2}$. In other words, when the target object moves within a distance range {$X_{3\_1}$, $X_{3\_2}$}, the target object can be detected from the captured image IMG by using the bounding box that is assigned to the X-axis coordinate value X_P3 and has a bounding box height equal to the Y-axis coordinate value Y_P3.

Regarding a bounding box that is assigned to the X-axis coordinate value X_P4 and has a bounding box height equal to the Y-axis coordinate value Y_P4, it offers a detection range R_P4 defined by {Y_P4+Y4, Y_P4-Y4} in Y-axis direction and {$X_{4\_1}$, $X_{4\_2}$} in X-axis direction, where Y4 is determined by Y_P4. For example, Y4=0.25*Y_P4. In accordance with the lens distribution curve CV, an image height of the target object is equal to Y_P4+Y4 when the target object is located at $X_{4\_1}$, and an image height of the target object is equal to Y_P4-Y4 when the target object is located at $X_{4\_2}$. In other words, when the target object moves within a distance range {$X_{4\_1}$, $X_{4\_2}$}, the target object can be detected from the captured image IMG by using the bounding box that is assigned to the X-axis coordinate value X_P4 and has a bounding box height equal to the Y-axis coordinate value Y_P4.

Regarding a bounding box that is assigned to the X-axis coordinate value X_P5 and has a bounding box height equal to the Y-axis coordinate value Y_P5, it offers a detection range R_P5 defined by {Y_P5+Y5, Y_P5-Y5} in Y-axis direction and {$X_{5\_1}$, $X_{5\_2}$} in X-axis direction, where Y5 is determined by Y_P5. For example, Y5=0.25*Y_P5. In accordance with the lens distribution curve CV, an image height of the target object is equal to Y_P5+Y5 when the target object is located at $X_{5\_1}$, and an image height of the target object is equal to Y_P5-Y5 when the target object is located at $X_{5\_2}$. In other words, when the target object moves within a distance range {$X_{5\_1}$, $X_{5\_2}$}, the target object can be detected from the captured image IMG by using the bounding box that is assigned to the X-axis coordinate value X_P5 and has a bounding box height equal to the Y-axis coordinate value Y_P5.

Regarding a bounding box that is assigned to the X-axis coordinate value X_P6 and has a bounding box height equal to the Y-axis coordinate value Y_P6, it offers a detection range R_P6 defined by {Y_P6+Y6, Y_P6-Y6} in Y-axis direction and {$X_{6\_1}$, $X_{6\_2}$} in X-axis direction, where Y6 is determined by Y_P6. For example, Y6=0.25*Y_P6. In accordance with the lens distribution curve CV, an image height of the target object is equal to Y_P6+Y6 when the target object is located at $X_{6\_1}$, and an image height of the target object is equal to Y_P6-Y6 when the target object is located at $X_{6\_2}$. In other words, when the target object moves within a distance range {$X_{6\_1}$, $X_{6\_2}$}, the target object can be detected from the captured image IMG by using the bounding box that is assigned to the X-axis coordinate value X_P6 and has a bounding box height equal to the Y-axis coordinate value Y_P6.

Regarding a bounding box that is assigned to the X-axis coordinate value X_P7 and has a bounding box height equal to the Y-axis coordinate value Y_P7, it offers a detection range R_P7 defined by {Y_P7+Y7, Y_P7-Y7} in Y-axis direction and {$X_{7\_1}$, $X_{7\_2}$} in X-axis direction, where Y7 is determined by Y_P7. For example, Y7=0.25*Y_P7. In accordance with the lens distribution curve CV, an image height of the target object is equal to Y_P7+Y7 when the target object is located at $X_{7\_1}$, and an image height of the target object is equal to Y_P7-Y7 when the target object is located at $X_{7\_2}$. In other words, when the target object moves within a distance range {$X_{7\_1}$, $X_{7\_2}$}, the target object can be detected from the captured image IMG by using the bounding box that is assigned to the X-axis coordinate value X_P7 and has a bounding box height equal to the Y-axis coordinate value Y_P7.

As illustrated in FIG. 6, a detection bounding box range R_DBBX (e.g., P7_Y~P1_Y) required by the target detection distance range R_DD (e.g., P1_X~P7_X) is fully covered by detection ranges R_P1-R_P7 of bounding boxes, where the distribution of bounding boxes is determined according to the lens distortion curve CV, and the lens distortion curve CV is determined according to the lens configuration information LC of the lens 12. Consider a case where a target object moves from a first end P1_X (or P7_X) of the target detection distance range R_DD to a second end P7_X (or P1_X) of the target detection distance range R_DD. The processing circuit 102 receives captured images IMG that are successively generated while the target object moves from the first end of the target detection distance range R_DD to the second end of the target detection distance range R_DD, and performs object detection upon the captured images IMG according to bounding boxes with different detection ranges R_P1-R_P7, wherein the object detection detects the target object in each of the captured images IMG by using at least one of the bounding boxes. Since the points P1-P7 distribute more evenly, detection ranges of every two adjacent bounding boxes are more likely to continue or overlap for offering a continuous detection range. For example, the target detection distance range R_DD includes non-overlapping detection segments {P1_X-P2_X, P2_X-P3_X, P3_X-P4_X, P4_X-P5_X, P5_X-P6_X, P6_X-P7_X} that are evenly distributed; and only two bounding boxes are involved in the object detection for each of the non-overlapping detection segments {P1_X-P2_X, P2_X-P3_X, P3_X-P4_X, P4_X-P5_X, P5_X-P6_X, P6_X-P7_X}. Compared to the bounding box distribution implementation without considering the lens configuration, the proposed bounding box distribution implementation allows the target object to be well detected more easily due to continuous detection ranges offered by bounding boxes properly distributed along the target detection distance range.

Figure 7:
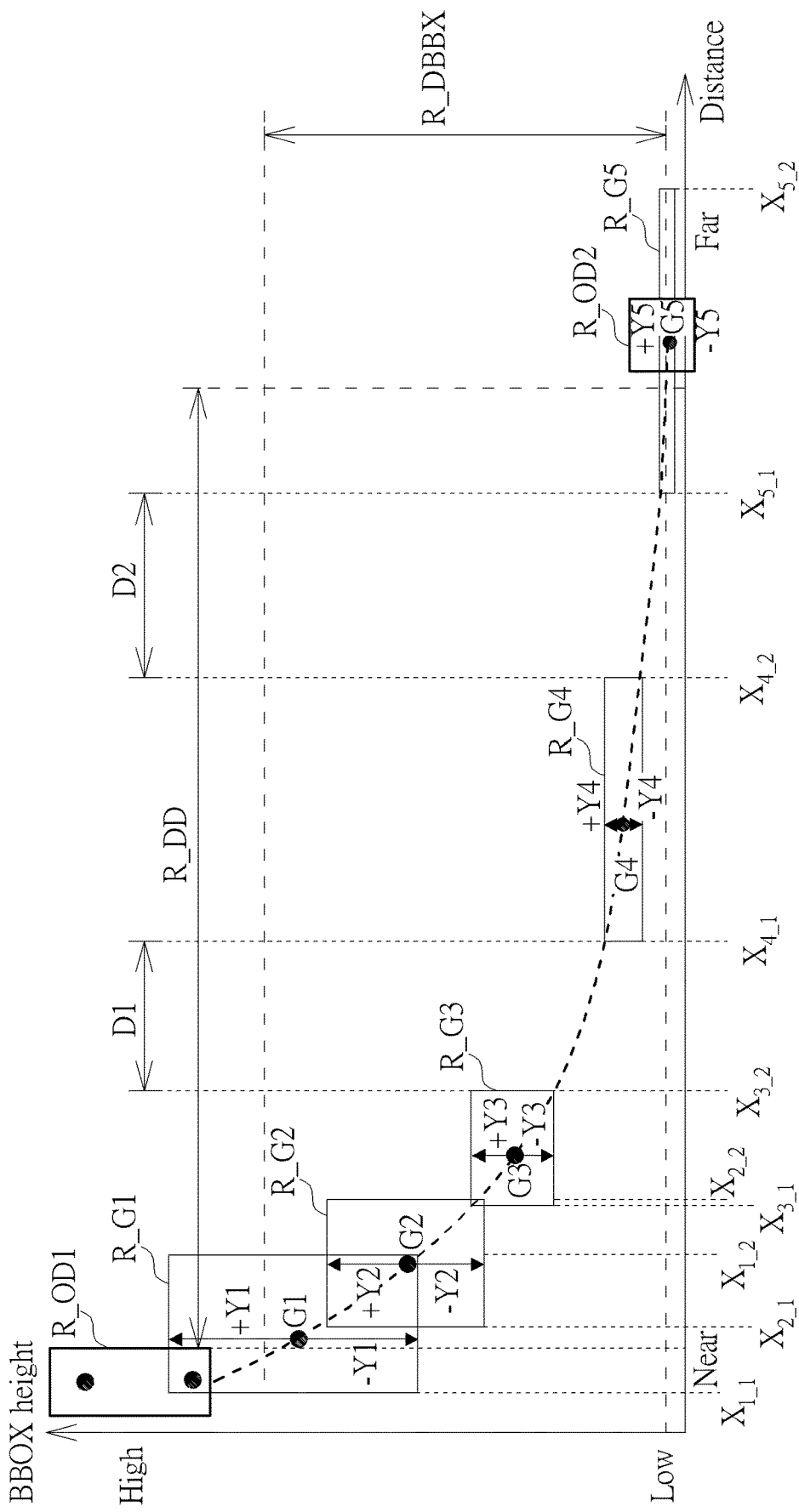
FIG. 7 is a diagram illustrating an example of a bounding box distribution that is determined without considering lens configuration information.

Please refer to FIG. 6 in conjunction with FIG. 7. FIG. 7 is a diagram illustrating an example of a bounding box distribution that is determined without considering the lens configuration. In a case where the lens configuration is not involved in determination of the bounding box distribution, a fixed bounding box distribution (e.g., a bounding box distribution generally used by objection detection applied to a normal image captured by a camera with a normal lens) may be used by objection detection applied to a fisheye image captured by a camera with a fisheye lens. As shown in FIG. 7, some bounding boxes are assigned to detection distances beyond the target detection distance range R_DD, thus resulting in over detection ranges R_OD1 and R_OD2 that are not capable of detecting a target object moving within the target detection distance range R_DD. In addition, when the lens configuration is considered to adaptively adjust the bounding box distribution, using the fixed bounding box distribution may suffer from bad detection ranges due to non-uniform distribution of bounding boxes along the target detection distance range.

Regarding a bounding box that is assigned to an X-axis coordinate value $X\_G1$ of a point G1 and has a bounding box height equal to a Y-axis coordinate value $Y\_G1$ of the point G1, it offers a detection range R_G1 defined by $\{Y\_G1+Y1, Y\_G1-Y1\}$ in Y-axis direction and $\{X_{1\_1}, X_{1\_2}\}$ in X-axis direction, where Y1 is determined by $Y\_G1$. For example, $Y1=0.25*Y\_G1$. When the target object moves within a distance range $\{X_{1\_1}, X_{1\_2}\}$, the target object can be detected from a captured image (e.g., a captured image generated from a camera with a fisheye lens) by using the bounding box that is assigned to the X-axis coordinate value $X\_G1$ and has a bounding box height equal to the Y-axis coordinate value $Y\_G1$.

Regarding a bounding box that is assigned to an X-axis coordinate value $X\_G2$ of a point G2 and has a bounding box height equal to a Y-axis coordinate value $Y\_G2$ of the point G2, it offers a detection range R_G2 defined by $\{Y\_G2+Y2, Y\_G2-Y2\}$ in Y-axis direction and $\{X_{2\_1}, X_{2\_2}\}$ in X-axis direction, where Y2 is determined by $Y\_G2$. For example, $Y2=0.25*Y\_G2$. When the target object moves within a distance range $\{X_{2\_1}, X_{2\_2}\}$, the target object can be detected from a captured image (e.g., a captured image generated from a camera with a fisheye lens) by using the bounding box that is assigned to the X-axis coordinate value $X\_G2$ and has a bounding box height equal to the Y-axis coordinate value $Y\_G2$.

Regarding a bounding box that is assigned to an X-axis coordinate value $X\_G3$ of a point G3 and has a bounding box height equal to a Y-axis coordinate value $Y\_G3$ of the point G3, it offers a detection range R_G3 defined by $\{Y\_G3+Y3, Y\_G3-Y3\}$ in Y-axis direction and $\{X_{3\_1}, X_{3\_2}\}$ in X-axis direction, where Y3 is determined by $Y\_G3$. For example, $Y3=0.25*Y\_G3$. When the target object moves within a distance range $\{X_{3\_1}, X_{3\_2}\}$, the target object can be detected from a captured image (e.g., a captured image generated from a camera with a fisheye lens) by using the bounding box that is assigned to the X-axis coordinate value $X\_G3$ and has a bounding box height equal to the Y-axis coordinate value $Y\_G3$.

Regarding a bounding box that is assigned to an X-axis coordinate value $X\_G4$ of a point G4 and has a bounding box height equal to a Y-axis coordinate value $Y\_G4$ of the point G4, it offers a detection range R_G4 defined by $\{Y\_G4+Y4, Y\_G4-Y4\}$ in Y-axis direction and $\{X_{4\_1}, X_{4\_2}\}$ in X-axis direction, where Y4 is determined by $Y\_G4$. For example, $Y4=0.25*Y\_G4$. When the target object moves within a distance range $\{X_{4\_1}, X_{4\_2}\}$, the target object can be detected from a captured image (e.g., a captured image generated from a camera with a fisheye lens) by using the bounding box that is assigned to the X-axis coordinate value $X\_G4$ and has a bounding box height equal to the Y-axis coordinate value $Y\_G4$.

Regarding a bounding box that is assigned to an X-axis coordinate value $X\_G5$ of a point G5 and has a bounding box height equal to the Y-axis coordinate value $Y\_G5$ of the point G5, it offers a detection range R_G5 defined by $\{Y\_G5+Y5, Y\_G5-Y5\}$ in Y-axis direction and $\{X_{5\_1}, X_{5\_2}\}$ in X-axis direction, where Y5 is determined by $Y\_G5$. For example, $Y5=0.25*Y\_G5$. When the target object moves within a distance range $\{X_{5\_1}, X_{5\_2}\}$, the target object can be detected from a captured image (e.g., a captured image generated from a camera with a fisheye lens) by using the bounding box that is assigned to the X-axis coordinate value $X\_G5$ and has a bounding box height equal to the Y-axis coordinate value $Y\_G5$.

As illustrated in FIG. 7, a detection bounding box range R_DBBX required by the target detection distance range R_DD is not fully covered by detection ranges R_G1-R_G5 of bounding boxes. Specifically, when the target object moves within a distance range D1 (i.e., $X_{3\_2} \sim X_{4\_1}$), the target object cannot be detected from the captured image IMG due to lack of a needed detection range covering the distance range D1. The target object is hard to be detected until entering the detection range R_G3 or R_G4. Similarly, when the target object moves within a distance range D2 (i.e., $X_{4\_2} \sim X_{5\_1}$), the target object cannot be detected from the captured image IMG due to lack of a needed detection range covering the distance range D2. The target object is hard to be detected until entering the detection range R_G4 or R_G5.

Figure 8:
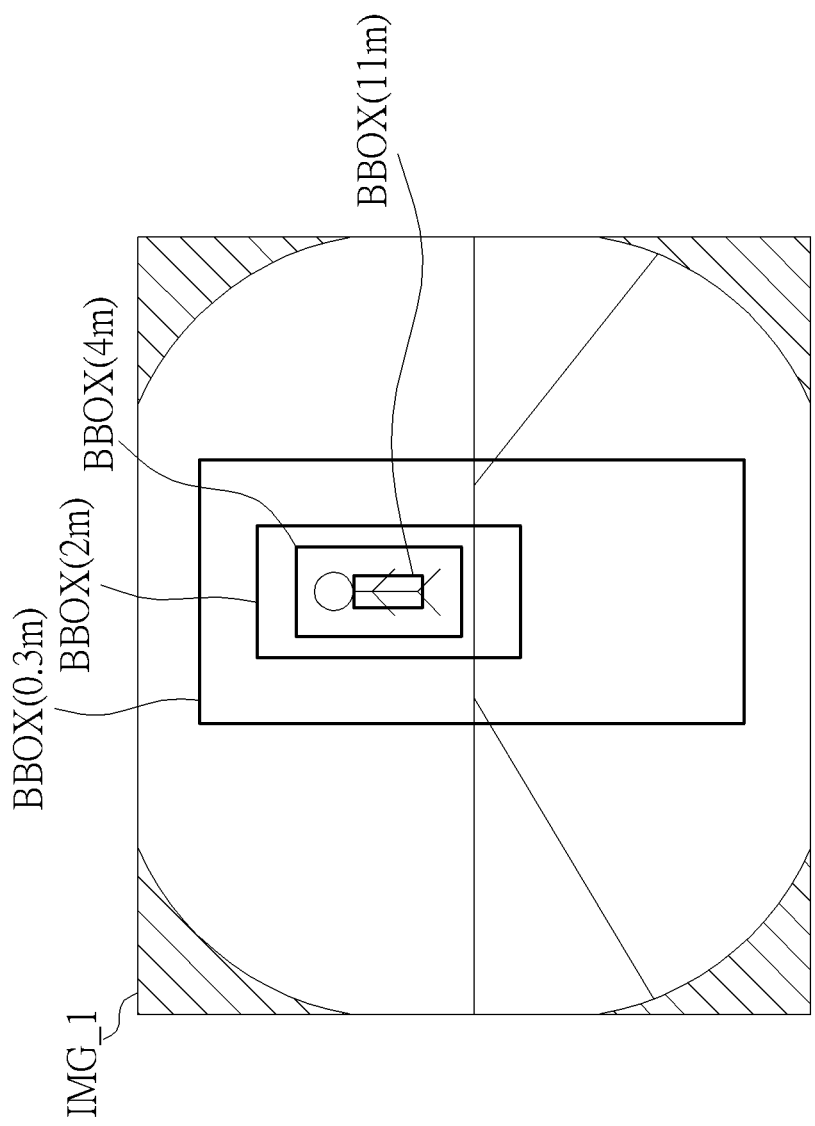
FIG. 8 is a diagram illustrating object detection applied to a fisheye image by using bounding boxes assigned to different detection distances.
Figure 9:
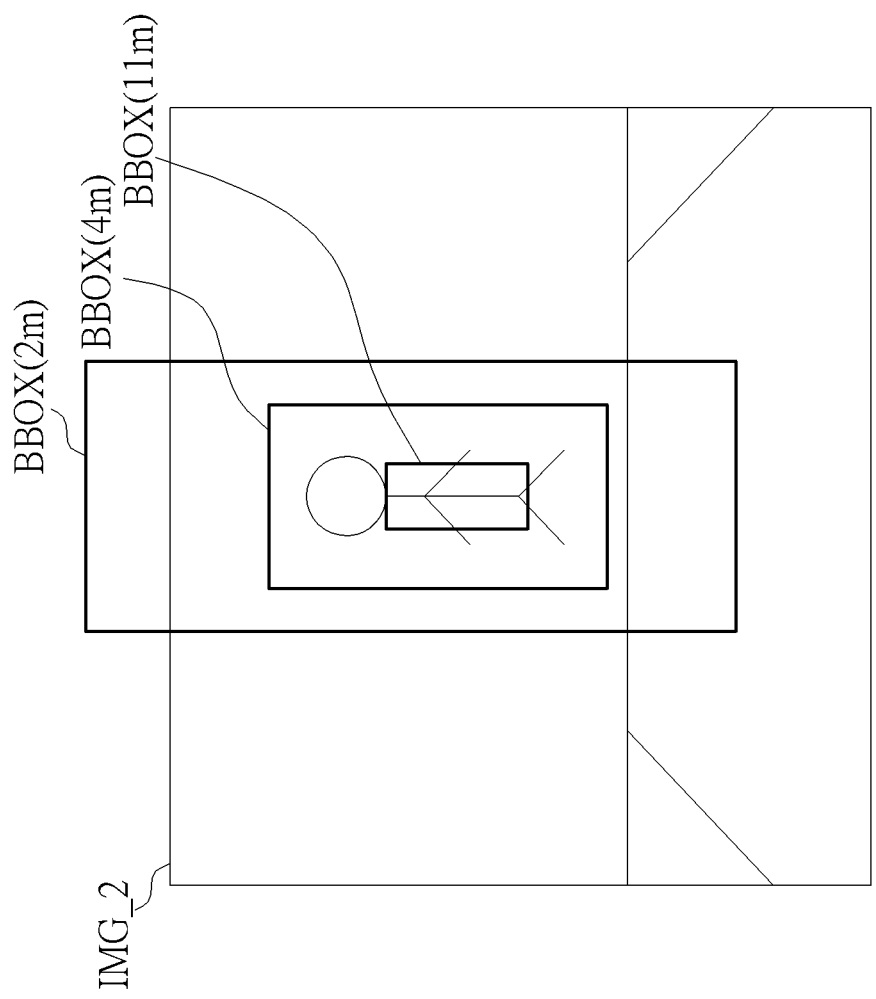
FIG. 9 is a diagram illustrating object detection applied to an ordinary image by using bounding boxes assigned to different detection distances.

In this embodiment, the lens 12 is a wide-view lens such as a fisheye lens. Compared to an ordinary lens, the fisheye lens has a wider field of view (FOV). In addition, compared to an ordinary image captured by an image capture device using the ordinary lens, a fisheye image captured by an image capture device using the fisheye lens is severely distorted. Hence, the pixel number of a boundary box height for the same distance and the same object is different between the ordinary image and the fisheye image. Please refer to FIG. 8 in conjunction with FIG. 9. FIG. 8 is a diagram illustrating object detection applied to a fisheye image by using bounding boxes assigned to different detection distances. FIG. 9 is a diagram illustrating object detection applied to an ordinary image by using bounding boxes assigned to different detection distances. Regarding objection detection applied to the ordinary image IMG_2, a bounding box assigned to a detection distance being 2 m (denoted by "BBOX (2 m)") may have a bounding box height with about 260 pixels, a bounding box assigned to a detection distance being 4 m (denoted by "BBOX (4 m)") may have a bounding box height with about 140 pixels, and a bounding box assigned to a detection distance being 11 m (denoted by "BBOX (11 m)") may have a bounding box height with about 60 pixels. As shown in FIG. 9, a portion of the bounding box (denoted by "BBOX (2 m)") is outside the top boundary of the ordinary image IMG_2. Furthermore, a bounding box assigned to a detection distance being 0.3 m (not shown) is out of range.

Regarding objection detection applied to the fisheye image IMG_1, a bounding box assigned to a detection distance being 0.3 m (denoted by "BBOX (0.3 m)") may have a bounding box height with about 250 pixels, a bounding box assigned to a detection distance being 2 m (denoted by "BBOX (2 m)") may have a bounding box height with about 70 pixels, a bounding box assigned to a detection distance being 4 m (denoted by "BBOX (4 m)") may have a bounding box height with about 46 pixels, and a bounding box assigned to a detection distance being 11 m (denoted by "BBOX (11 m)") may have a bounding box height with about 19 pixels. As shown in FIG. 8, all of the bounding boxes are fully inside the fisheye image IMG_1. In accordance with the proposed lens configuration based bounding box distribution design, the bounding boxes may be properly set to fit a lens distortion curve that is determined on the basis of lens configuration information of a lens (e.g., fisheye lens). The bounding boxes are properly distributed along a target detection distance range, thereby ensuring that a detection bounding box range required by the target detection distance range is fully covered by detection ranges of the bounding boxes.

In above embodiments, bounding boxes may be evenly distributed for ensuring that a detection bounding box range required by a target detection distance range is fully covered by detection ranges of the bounding boxes. However, this is for illustrative purposes only, and is not meant to be a limitation of the present invention. Alternatively, the same objective of ensuring that a detection bounding box range required by a target detection distance range is fully covered by detection ranges of bounding boxes can be achieved by using the bounding boxes that are allocated in a non-uniform distribution manner.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection apparatus comprising:
a boundary box decision circuit, arranged to receive lens configuration information of a lens, and refer to the lens configuration information to determine a bounding box distribution of bounding boxes, wherein the bounding boxes are assigned to different detection distances with respect to the lens for detection of a target object; and
a processing circuit, arranged to receive a captured image that is derived from an output of an image capture device using the lens, and perform object detection upon the captured image according to the bounding box distribution of the bounding boxes.

2. The object detection apparatus of claim 1, wherein the lens is a fisheye lens.

3. The object detection apparatus of claim 1, wherein the boundary box decision circuit is coupled to the image capture device, and receives the lens configuration information of the lens from the image capture device; or
wherein the boundary box decision circuit is coupled to a hardware buffer that is not a part of the image capture device, and the boundary box decision circuit retrieves the lens configuration information of the lens from the hardware buffer.

4. The object detection apparatus of claim 1, wherein the object detection performed by the processing circuit is deep-learning based object detection.

5. The object detection apparatus of claim 4, wherein the processing circuit is an artificial intelligence (AI) processor implemented by a convolution accelerator, a graphics processing unit (GPU), or an application-specific integrated circuit (ASIC).

6. The object detection apparatus of claim 1, wherein a detection bounding box range required by a target detection distance range is fully covered by detection ranges of the bounding boxes.

7. The object detection apparatus of claim 6, wherein the different detection distances with respect to the lens are uniformly distributed along the target detection distance range.

8. The object detection apparatus of claim 1, wherein the boundary box decision circuit calculates a lens distortion curve according to the lens configuration information of the lens, and determines the bounding box distribution of the bounding boxes according to the lens distortion curve, where the lens distortion curve maps a detection distance between the target object and the lens to an object size of the target object on an image plane.

9. The object detection apparatus of claim 1, wherein the processing circuit employs a training model with anchor boxes, and the boundary box decision circuit selects only a portion of the anchor boxes as the bounding boxes.

10. An object detection method comprising:
receiving lens configuration information of a lens;
determining, by a boundary box decision circuit, a bounding box distribution of bounding boxes according to the lens configuration information, wherein the bounding boxes are assigned to different detection distances with respect to the lens for detection of a target object;
receiving a captured image that is derived from an output of an image capture device using the lens; and
performing object detection upon the captured image according to the bounding box distribution of the bounding boxes.

11. The object detection method of claim 10, wherein the lens is a fisheye lens.

12. The object detection method of claim 10, wherein the lens configuration information of the lens is received from the image capture device; or
wherein the lens configuration information of the lens is retrieved from a hardware buffer that is not a part of the image capture device.

13. The object detection method of claim 10, wherein the object detection performed upon the captured image is deep-learning based object detection.

14. The object detection method of claim 13, wherein the deep-learning based object detection is performed by a convolution accelerator, a graphics processing unit (GPU), or an application-specific integrated circuit (ASIC).

15. The object detection method of claim 10, wherein a detection bounding box range required by a target detection distance range is fully covered by detection ranges of the bounding boxes.

16. The object detection method of claim 15, wherein the different detection distances with respect to the lens are uniformly distributed along the target detection distance range.

17. The object detection method of claim 10, wherein determining the bounding box distribution of bounding boxes according to the lens configuration information comprises:
calculating a lens distortion curve according to the lens configuration information of the lens, wherein the lens distortion curve maps a detection distance between the target object and the lens to an object size of the target object on an image plane; and determining the bounding box distribution of the bounding boxes according to the lens distortion curve.

18. The object detection method of claim 10, further comprising:
providing a training model with anchor boxes;
wherein determining the bounding box distribution of the bounding boxes according to the lens configuration information comprises:
determining the bounding boxes by selecting only a portion of the anchor boxes.

19. An object detection method comprising:
receiving captured images that are successively generated while a target object moves from a first end of a target detection distance range to a second end of the target detection distance range; and
performing, by a processing circuit, object detection upon the captured images according to a plurality of bounding boxes with different detection ranges, wherein said object detection detects the target object in each of the captured images by using at least one of the bounding boxes.

20. The object detection method of claim 19, wherein the target detection distance range comprises non-overlapping detection segments that are evenly distributed; and only two bounding boxes are involved in said object detection for each of the non-overlapping detection segments.

\* \* \* \* \*